(12) United States Patent
Bartko

(10) Patent No.: US 9,958,525 B2
(45) Date of Patent: May 1, 2018

(54) MEASURING DEVICE AND MEASURING METHOD FOR DIRECTION FINDING AND DIRECTION UNCERTAINTY DETERMINATION

(71) Applicant: Rohde & Schwarz GmbH & Co. KG, Munich (DE)

(72) Inventor: Hendrik Bartko, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 213 days.

(21) Appl. No.: 14/772,666

(22) PCT Filed: Mar. 5, 2013

(86) PCT No.: PCT/EP2013/054370
§ 371 (c)(1),
(2) Date: Sep. 3, 2015

(87) PCT Pub. No.: WO2014/135196
PCT Pub. Date: Sep. 12, 2014

(65) Prior Publication Data
US 2016/0018506 A1   Jan. 21, 2016

(51) Int. Cl.
*G01S 5/04*   (2006.01)
*G01S 3/04*   (2006.01)
*G01S 3/28*   (2006.01)
*G01S 3/74*   (2006.01)
*G01S 3/46*   (2006.01)

(52) U.S. Cl.
CPC .............. *G01S 3/046* (2013.01); *G01S 3/043* (2013.01); *G01S 3/28* (2013.01); *G01S 3/74* (2013.01); *G01S 3/46* (2013.01)

(58) Field of Classification Search
CPC . G01S 5/04; G01S 3/046; G01S 3/043; G01S 3/28; G01S 3/74
USPC ......................................................... 342/443
See application file for complete search history.

(56) References Cited

U.S. PATENT DOCUMENTS

| 3,059,233 | A | * | 10/1962 | Guarino | ................ | G01C 23/00 |
| | | | | | | 33/1 CC |
| 4,203,667 | A | * | 5/1980 | Pierce | .................... | G01B 11/26 |
| | | | | | | 356/141.3 |
| 5,173,709 | A | * | 12/1992 | Lauro | .................... | G01C 17/30 |
| | | | | | | 33/349 |
| 6,801,850 | B1 | * | 10/2004 | Wolfson | ............. | G01C 21/3415 |
| | | | | | | 340/995.23 |
| 2004/0164902 | A1 | * | 8/2004 | Karlsson | ................ | G01S 3/046 |
| | | | | | | 342/449 |

(Continued)

FOREIGN PATENT DOCUMENTS

DE     102004020276 A1   11/2005

*Primary Examiner* — Harry K Liu
(74) *Attorney, Agent, or Firm* — Ditthavong & Steiner, P.C.

(57) ABSTRACT

A measuring device for direction finding of an electromagnetic signal includes an antenna-element for receiving the electromagnetic signal and processing means for determining the direction of the electromagnetic signal and displaying the direction of the electromagnetic signal. The processing means further include direction uncertainty determination means (322) for determining a direction uncertainty angle of the direction of the electromagnetic signal. The processing means are set up for displaying the direction uncertainty angle on display means.

12 Claims, 5 Drawing Sheets

(56) References Cited

U.S. PATENT DOCUMENTS

| | | | |
|---|---|---|---|
| 2007/0013525 A1* | 1/2007 | Kampel | A63B 29/021 340/573.1 |
| 2007/0290924 A1* | 12/2007 | McCoy | G06Q 10/087 342/464 |
| 2010/0138184 A1* | 6/2010 | Fernandez | G01S 5/02 702/150 |
| 2010/0321242 A1 | 12/2010 | Robinson et al. | |
| 2011/0050502 A1 | 3/2011 | Gribler | |
| 2011/0133987 A1* | 6/2011 | Bernsten | H04B 7/086 342/417 |
| 2012/0026042 A1 | 2/2012 | Gooch et al. | |

* cited by examiner

MEASURING DEVICE AND MEASURING METHOD FOR DIRECTION FINDING AND DIRECTION UNCERTAINTY DETERMINATION

CROSS-REFERENCE TO RELATED APPLICATION

The present application is a national phase application of PCT Application No. PCT/EP2013/054370, filed Mar. 5, 2013, the entire contents of which are herein incorporated by reference.

TECHNICAL FIELD

The invention, according to the various embodiments described herein, relates to a measuring device and a measuring method for direction finding of electromagnetic signals and for determining and displaying a direction uncertainty.

BACKGROUND

Conventional systems for direction finding usually display the detected direction of an incoming electromagnetic signal as a line or arrow originating from a center of a display pointing into the direction, the electromagnetic signal came from. For a user of such a measuring device, it is though not possible to determine how accurate the direction finding was. Especially in situations, in which several electromagnetic pulses are detected shortly after each other originating from closely spaced direction, it is not clear for the user if these signals are from a single signal source or if several signal sources are concerned, since he does not know how accurately the detected directions are known.

For example, the document DE 10 2004 020 276 A1 shows such a conventional direction finding device and method. However, a user cannot easily determine how confident the found directions of the received signals are.

A measuring device and a measuring method which are able to more accurately determine a direction, an electromagnetic signal originates from and which enable a user to distinguish between different signal sources are provided herein.

A measuring device for direction finding of an electromagnetic signal may include an antenna-element for receiving the electromagnetic signal and processing means for determining the direction of the electromagnetic signal and displaying the direction of the electromagnetic signal. The processing means may further include direction uncertainty determination means for determining a direction uncertainty angle of the direction of the electromagnetic signal. The processing means are set up for displaying the direction uncertainty angle on display means. It is therefore easily possible for a user to distinguish if signal source directions which lie close together, originate from a single signal source or from different signal sources.

In one embodiment, the processing means are set up for displaying the direction of the electromagnetic signal as a line or an arrow pointing in the direction of the electromagnetic signal on the display means, and for displaying the direction uncertainty angle as an area or as two direction uncertainty border lines around the line or the arrow pointing in the direction of the electromagnetic signal or as a shape connected to the line or the arrow pointing in the direction of the electromagnetic signal on the display means.

A user can thereby see on the first glance, in which angular area the signal source direction probably lies.

In one embodiment, the processing means may include a direction databank holding pre-stored data linking antenna-element output signals to directions of electromagnetic signals. The processing means are then set up for determining the direction of the electromagnetic signal by performing a search for a closest match of present antenna-element output signals to the pre-stored antenna-element output signals in the direction databank. It is therefore possible to determine the direction and the direction uncertainty angle, which reduces computational power.

Advantageously, the search is performed using a search function, wherein the search function is a $\lambda^2$ function or a maximum likelihood function or is based upon a noise-density. This way, standard search functions can be used resulting in a low implementation complexity.

The direction uncertainty determination means are advantageously set up for determining the direction uncertainty angle from the search function. More advantageously, a steepness of the search function at the direction of the electromagnetic signal is used. Even more advantageously, an angular distance of two samples of the search function having a preset distance of respective search function values to a search function value of the direction of the electromagnetic signal is used to determine the uncertainty angle. It is therefore possible to determine the uncertainty angle without high additional computational cost.

A measuring method serves the purpose of direction finding of an electromagnetic signal. The method includes determining the direction of the electromagnetic signal and displaying the direction of the electromagnetic signal. The method further includes determining a direction uncertainty angle of the direction of the electromagnetic signal and displaying the direction uncertainty angle. It is therefore easily possible for a user to distinguish if signal source directions which lie close together, originate from a single signal source or from different signal sources.

An exemplary embodiment of the invention is now further explained by way of example only and with respect to the drawings in which.

First, we demonstrate the construction and function of the measuring device along FIG. 1-5. After that, the function of the measuring method is explained along FIG. 6. Similar entities and reference numbers in different figures have been partially omitted.

Figure 1:
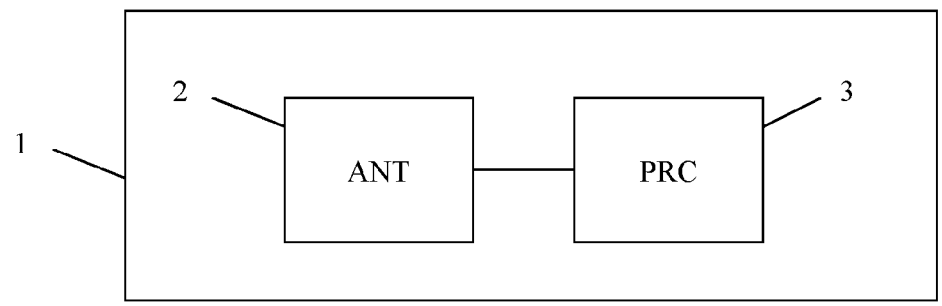
FIG. 1 shows an embodiment of a measuring device in a block diagram.

In FIG. 1, an embodiment of the measuring device 1 is shown. The measuring device includes an antenna-element 2 and connected to it processing means 3. An electromagnetic signal is received by the antenna-element 2 and processed by the processing means 3. The processing means 3 determine the direction and the direction uncertainty and display them. Regarding the construction and function of the antenna-element 2, it is referred to FIG. 2. Regarding the construction and function of the processing means 3, it is referred to FIG. 3-FIG. 5. The electromagnetic signals detected by the measuring device or measuring method are, for example, radar pulses or radio transmissions.

Figure 2:
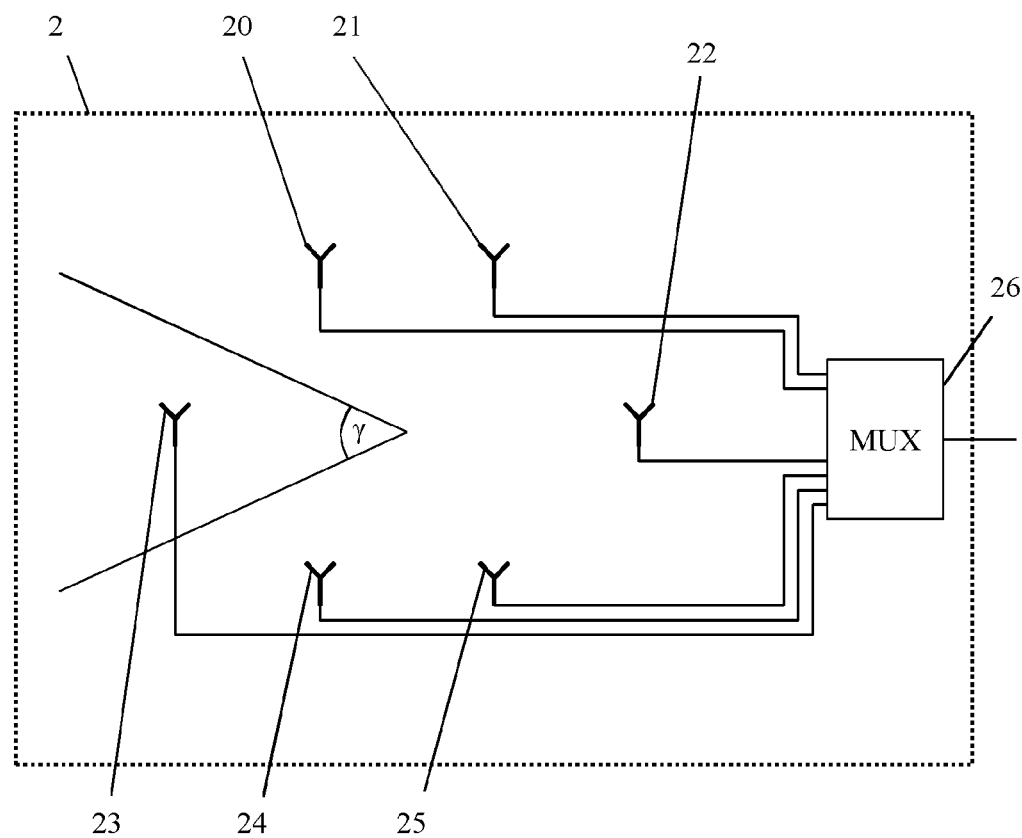
FIG. 2 shows a first detail of the measuring device in a block diagram.

FIG. 2 shows the inner workings of the antenna-element 2 of FIG. 1. The antenna-element 2 includes a plurality of antennas 20-25, which each are connected to multiplexing means 26. The multiplexing means 26 are set up for connecting a number of antennas out of the total available antennas 20-25 to the processing means 3 of FIG. 1. The number of connected antennas can be pre-specified or can be set by the processing means 3.

For example, antennas 20, 23 and 24 are connected by the multiplexing means 26 to the processing means 3 of FIG. 1. In this case, a receiving angle γ is achieved. Within this angle, the direction of incoming electromagnetic signals can be determined.

In an alternative embodiment, the multiplexing means 26 can be omitted. In this case, the antenna-element 2 merely includes the antennas 20-25.

The antenna-element 2 includes at least two different antennas 20-25. Alternatively, at least five different antennas are present. Alternatively, at least ten different antennas are present.

For being able to detect a direction of an incoming signal, at least the signals of two antennas have to be used.

Figure 3:
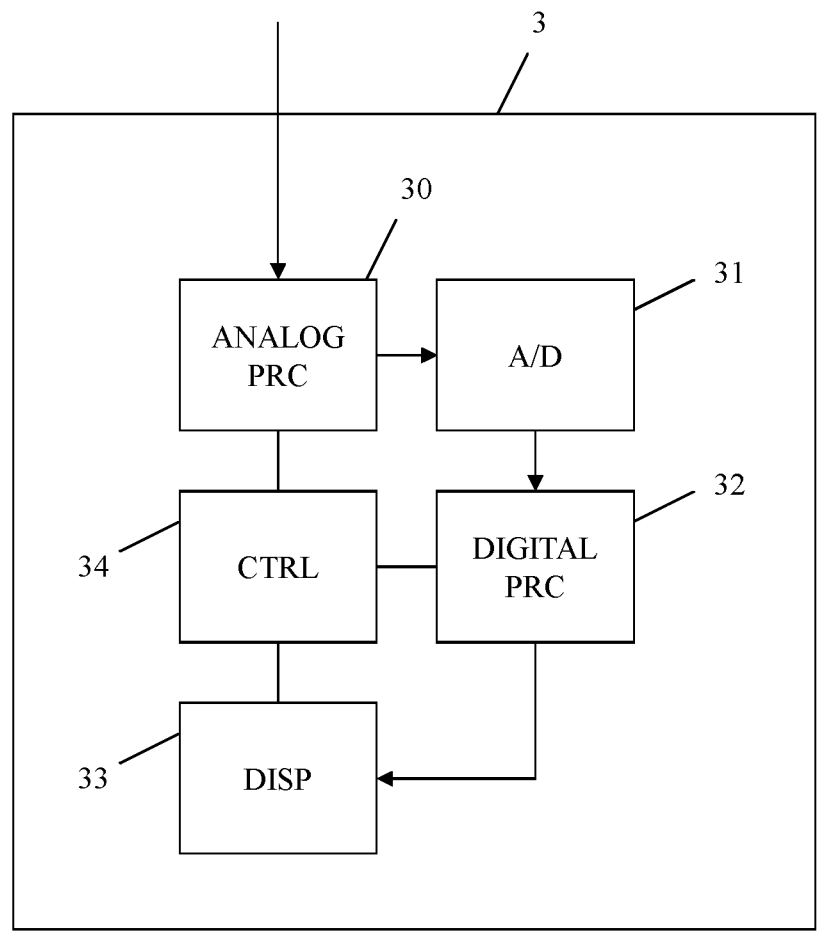
FIG. 3 shows a second detail of the measuring device.

In FIG. 3, the internal construction of the processing means 3 of FIG. 1 are shown. The processing means 3 includes analog processing means 30, which are supplied with the signal of antenna-element 2 of FIG. 1. Moreover, the processing means 3 includes an analog-digital-converter 31, which is connected to the analog processing means 30. The analog-digital-converter 31, again, is connected to digital processing means 32, which are connected to display means 33. The analog processing means 30, the digital processing means 32 and the display means 33 are connected to control means 34, which are set up for controlling these components.

Alternatively, the measuring device 1, more accurately the processing means 3 do not include display means 33. In this case, the results of the digital processing means 32, especially the direction and the direction uncertainty and optionally a direction quality are output over an interface, for example a local area network (LAN). These results can then be used, processed and displayed by any connected device. The results are then output using a pre-defined format, which can easily be used by other devices. For example the format "pulse description word" (PDW) is used.

Signals from the antenna-elements 2 are received by the analog processing means 30. These signals include the signals of the individual antennas 20-25 of FIG. 2 or of some of these antennas which are currently connected to the analog processing means 30 by use of the multiplexing means 26. Alternatively, the signals of all antennas 20-25 of FIG. 2 can be transmitted to the analog processing means 30.

The signal to be received by the analog processing means 30 is processed by them. For example, an amplification and a power determination can be performed. The resulting signals are handed on to the analog-digital converter 31, which digitizes the signals. The digitized signals are passed to the digital processing means 32, which perform digital processing. The digital processing means 32 perform a determination of the direction of the detected electromagnetic signal. Moreover, the digital processing means 32 determine a direction uncertainty angle of the direction of the electromagnetic signal. These results are handed on to the display means 33, which display the direction and the uncertainty angle of the direction. Regarding the inner workings of the digital processing means 32, it is referred to FIG. 4.

Figure 4:
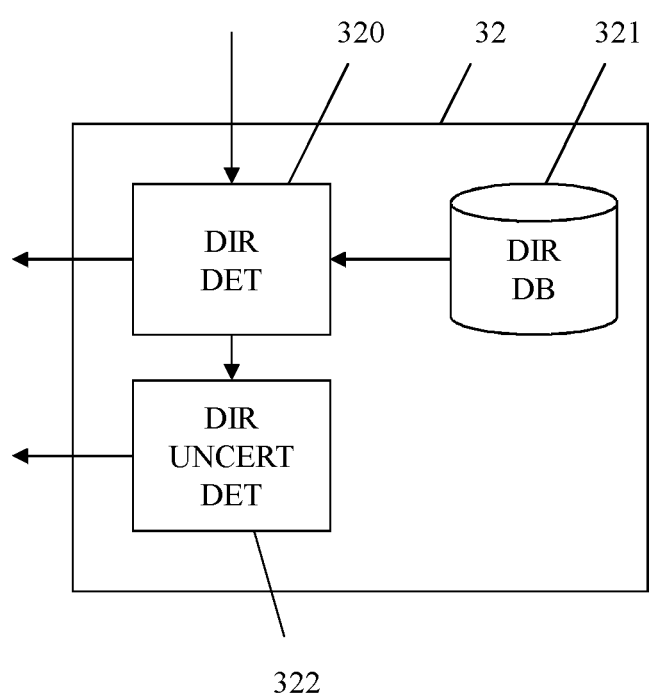
FIG. 4 shows a third detail of the measuring device.

In FIG. 4, the construction of the digital processing means 32 is shown. The digital processing means 32 of FIG. 3 include direction detection means 320, which are connected to the analog-digital-converter 31 of FIG. 3 and to the display means 33 of FIG. 3. Furthermore, the digital processing means 32 include a direction databank 321, which is connected to the direction detection means 320. Moreover, the digital processing means 32 include direction uncertainty determination means 322, which are also connected to the direction determination means 320. Moreover, the direction uncertainty determination means 322 are also connected to the display means 33 of FIG. 3.

The direction database 321 holds pre-stored data-linking antenna-element output signals to directions of received electromagnetic signals. Parameters stored within the direction database 321 are for example received power of each individual antenna, timing of the reception of the signal by the individual antenna and received frequency of the signal at the individual antennas. These parameters are stored for each pre-stored signal source, defined by its direction in azimuth and elevation, its polarization and its frequency.

Due to the large number of parameters, a very large amount of data has to be searched in order to determine which direction is the correct direction for a presently received electromagnetic signal. Therefore, the direction determination means 320 and the direction uncertainty determination means 322 are advantageously constructed as a FPGA (field programmable gate array) or several FPGAs working in parallel.

After determining the direction of the incoming electromagnetic signal by the direction determination means 320, the direction uncertainty angle is determined by the direction uncertainty determination means 322. For determining the direction uncertainty angle, the search function used for determining the direction is again used. The search function results in a minimum, which indicates the closest match to a direction within the direction databank 321. The direction uncertainty angle is determined from the steepness of the search function in the area of this minimum. Especially, an angular distance of two samples of the search function having a preset distance of respective search function values to a search function value of the direction of the electromagnetic signal is calculated.

Therefore, the direction uncertainty angle is low for a high steepness of the search function in the area of the minimum, while it is high for a low steepness of the search function in the area of the minimum.

In the following, the underlying mathematics are described in detail. For performing the direction finding of the electromagnetic signal, the electromagnetic signal is sampled by several antennas forming an antenna-group as described earlier, for example the three antennas.

During production of the measuring device, each antenna-group is subjected to an initial measurement, with defined electromagnetic signals of defined direction in azimuth and elevation and defined frequency and polarization.

$$V_{ref,k}(\alpha,\vartheta,f,\pi)=A_{ref,k}(\alpha,\vartheta,f,\pi)\exp(j\phi_{ref,k}(\alpha,\varepsilon,f,\pi))$$

is defined as the resulting measured antenna voltage of the individual antennas k=1 . . . N for an electromagnetic signal of azimuth α, elevation ϑ, frequency f and polarization π. The following amplitude quotients and phase differences between the elements k and l arise:

$$r_{ref,kl}(\alpha,\varepsilon,f,\pi) = \frac{A_{ref,k}(\alpha,\varepsilon,f,\pi)}{A_{ref,l}(\alpha,\varepsilon,f,\pi)}$$

$$\Delta\phi_{ref,kl}(\alpha,\varepsilon,f,\pi) = \phi_{ref,k}(\alpha,\varepsilon,f,\pi) - \phi_{ref,l}(\alpha,\varepsilon,f,\pi)$$

From M repetitions of the above described reference measurement the measurement error can now be determined:

$$\sigma^2(r_{ref,kl}(\alpha,\varepsilon,f,\pi)) =$$

$$\frac{1}{M}\sum_{i=1}^{M}[r_{ref,kl,i}(\alpha,\varepsilon,f,\pi)]^2 - \left[\frac{1}{M}\sum_{i=1}^{M}r_{ref,kl,i}(\alpha,\varepsilon,f,\pi)\right]^2$$

$$\sigma^2(\Delta\phi_{ref,kl}(\alpha,\varepsilon,f,\pi)) =$$

$$\frac{1}{M}\sum_{i=1}^{m}[\Delta\phi_{ref,kl,i}(\alpha,\varepsilon,f,\pi)]^2 - \left[\frac{1}{M}\sum_{i=1}^{M}\Delta\phi_{ref,kl,i}(\alpha,\varepsilon,f,\pi)\right]^2$$

This measurement error though should not be confused with the above described direction uncertainty angle.

After these initial reference measurements are performed, the measuring device is shipped to a user. When an actual direction finding of a signal is performed, $$V_{mess,k,i} = A_{mess,k,i}\exp(j\phi_{mess,k,i})$$

defined as the measured antenna voltage of the individual antenna k=1 ... N for an electromagnetic signal of frequency f, unknown polarization and unknown direction. The electromagnetic signal is sampled consecutively i=1 ... M times. The following amplitude quotients and phase differences arise:

$$r_{mess,kl,i} = \frac{A_{mess,k,i}}{A_{mess,l,i}}$$

$$\Delta\phi_{mess,kl,i} = \phi_{mess,k,i} - \phi_{mess,l,i}$$

From the M signal samples, the measurement error can now be determined:

$$\sigma^2(r_{mess,kl}) = \frac{1}{M}\sum_{i=1}^{M}[r_{mess,kl,i}]^2 - \left[\frac{1}{M}\sum_{i=1}^{M}r_{mess,kl,i}\right]^2$$

$$\sigma^2(\Delta\phi_{mess,kl}) = \frac{1}{M}\sum_{i=1}^{M}[\Delta\phi_{mess,kl,i}]^2 - \left[\frac{1}{M}\sum_{i=1}^{M}\Delta\phi_{mess,kl,i}\right]^2$$

As explained above, this measurement error is not to be confused with the direction uncertainty angle. Although it can be additionally displayed. For example it can be displayed as a probability of correctness of each detected direction.

From the values calculated before, a search function is now calculated. In this example a $\lambda^2$ function is used. Alternatively, a maximum likelihood function or a function based upon a noise-density can also be used.

$$\chi^2(\alpha,\varepsilon,\pi) = \sum_{\substack{k,l \\ k<l}} \frac{[r_{ref,kl}(\alpha,\varepsilon,f,\pi) - r_{mess,kl}]^2}{\sigma^2(r_{ref,kl}(\alpha,\varepsilon,f,\pi)) + \sigma^2(r_{mess,kl})} +$$

$$\sum_{\substack{k,l \\ k<l}} \frac{[\Delta\phi_{ref,kl}(\alpha,\varepsilon,f,\pi) - \Delta\phi_{mess,kl}]^2}{\sigma^2(\Delta\phi_{ref,kl}(\alpha,\varepsilon,f,\pi)) + \sigma^2(\Delta\phi_{mess,kl})}$$

The values $(\alpha_0,\varepsilon_0,\pi_0)$ are now determined, such that $\lambda^2(\alpha_0,\varepsilon_0,\pi_0)$ is minimal. A direction finding quality can be calculated as:

$$p = 1 - P\left(\frac{2}{2}, \frac{\chi^2(\alpha_0,\varepsilon_0,\pi_0)}{2}\right)$$

wherein $$p\left(\frac{n}{2}, \frac{x}{2}\right)$$

describes a regularized incomplete gamma function.

The 1σ-Confidence intervals $\Delta\alpha$ and $\Delta\varepsilon$ are determined by numerically solving the following formulas:

$$\lambda^2(\alpha_0+\Delta\alpha,\varepsilon_0,\pi_0) = \lambda^2(\alpha_0,\varepsilon_0,\pi_0)+1$$

$$\lambda^2(\alpha_0,\varepsilon_0+\Delta\varepsilon,\pi_0) = \lambda^2(\alpha_0,\varepsilon_0,\pi_0)+1$$

1σ-Confidence intervals $\Delta\alpha$ and $\Delta\varepsilon$ correspond to the direction uncertainty angles.

Figure 5:
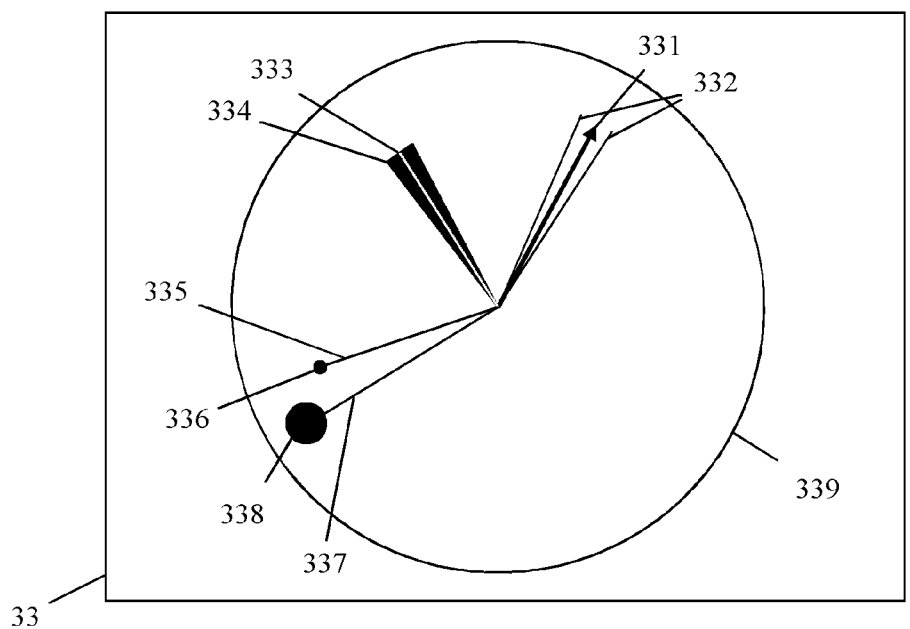
FIG. 5 shows a display content to be displayed by the measuring device.

In FIG. 5, a display content to be displayed by the display means 33 of FIG. 3 is shown. The display 33 shows a circle 339 indicating the search area. Using a shading, or a series of lines, a certain area of the circle 339 can be depicted as the presently active search angle, which has been selected through the antenna selection performed by the multiplexing means 26 of FIG. 2. This feature though is not depicted here for reasons of simplicity of the figure.

Within the circle 339, a number of alternative ways of displaying the direction and the direction uncertainty angle are shown. In practice, normally only one of these alternatives would be used at the same time. However, these alternatives can also be combined. A first direction is shown by use of an arrow 331 originating from the center of the circle 339 pointing into the direction, in which the electromagnetic signal was detected. The length of the arrow 331 corresponds to a probability of the displayed direction being correct. This probability of correctness can be derived from the value of the search function at the detected minimum. For example, it can be determined by multiplying this value of the search function with a weighting parameter.

The direction uncertainty angle is displayed here by use of lines 332, originating from the center of the circle 339 and progressing alongside the arrow 331. The distance of the lines 332 to the arrow 331 indicates the direction uncertainty angle.

A second direction is shown by a line 333, which points into the direction detected. Around the line 333, a shaded area 334 is displayed indicating the direction uncertainty angle. Instead of using shading, also different colors or different patterns can be used for indicating the direction uncertainty angle. Moreover, a probability of the detected direction can be shown by using a shading which loses intensity, as the distance to the line 333 decreases.

Moreover, a third direction is depicted by use of a line 335, which also originates at the center of the circle 339. At the end of the line 335, a circle 336 is shown depicting the direction uncertainty angle. The size of the circle 336 indicates the direction uncertainty angle. In the same manner, a fourth direction of an incoming signal is displayed by using a line 337 and a circle 338 at the end of the line. In comparison, the direction uncertainty angle indicated by the circle 338 is far larger than the direction uncertainty angle indicated by the circle 336.

Also here, the length of the lines 335, 337 correspond to the probability of the individual detected direction being correct. In case such a detected direction is not correct, it can be due to a high noise or to reflections.

Alternatively, the length of the lines 333, 335, 337 and arrows 331 can also be proportional to a received signal power or to the inverse of the received signal power or a distance of the signal source or the inverse of the distance of the signal source. In a further alternative, all lengths of lines 333, 335, 337 and arrows 331 are identical.

Figure 6:
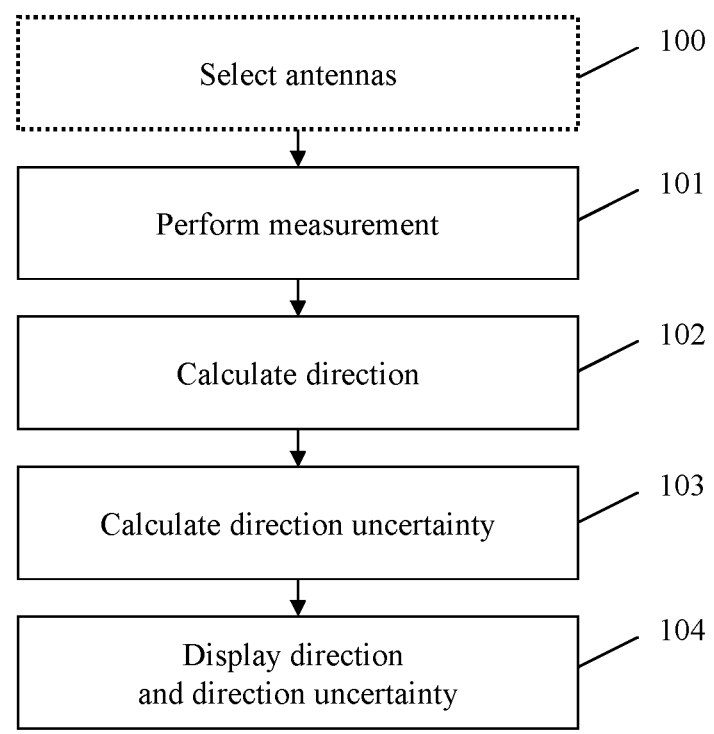
FIG. 6 shows a flowchart of a measuring method.

In FIG. 6, an embodiment of the measuring method is shown. In a first step, a number of antennas out of the total number of available antennas are selected for processing. This step 100 is an optional step. At least two antennas have to be used for being able to detect a direction of an incoming signal. Using more antennas at the same time leads to higher accuracy of detection but significantly increases the necessary processing power. Furthermore, by selecting a higher number of antennas used, a larger search angle γ as depicted in FIG. 2 can be achieved.

In a second step 101, a measurement is performed. The signal detected by each employed antenna is recorded. In a third step 102, a direction is calculated from the received signals. In order to perform this direction calculation, a comparison of the received signals with pre-stored signals and corresponding directions is performed. For this, a search function is used. The minimum of this search function results in the detected direction.

In a fourth step 103, a direction uncertainty is calculated by determining the steepness of the search function in the area of the detected minimum. From this steepness, the direction uncertainty angle is calculated. In a fifth step 105, the detected direction and the detected direction uncertainty angle are displayed. Regarding the actual processing, it is referred to the elaborations regarding FIGS. 2-5.

The invention is not limited to certain types of electromagnetic signals. Also the invention is not limited to a specific number of antennas. The characteristics of the exemplary embodiments can be used in any combination of features claimed in the claims, described in the description or drawn in the drawings.

The invention claimed is:

1. A measuring device for direction finding of an electromagnetic signal, comprising:
   an antenna-element with at least two antennas for receiving the electromagnetic signal,
   a display,
   a processor configured to determine the direction of the electromagnetic signal, and
   direction uncertainty determination means for determining a direction uncertainty angle of the direction of the electromagnetic signal,
   wherein the processor is configured to:
   display a circle indicating a search area on the display,
   display the direction of the electromagnetic signal as a line originating at a center of the circle and pointing in the direction of the electromagnetic signal on the display, and
   display the direction uncertainty angle as a circle connected to an end of the line pointing in the direction of the electromagnetic signal on the display.

2. The measuring device according to claim 1, wherein:
   the processor comprises a direction databank holding pre-stored data linking antenna-element output signals to directions of electromagnetic signals, and
   the processor is configured to determine the direction of the electromagnetic signal by performing a search for a closest match of present antenna-element output signals resulting from the electromagnetic signal to the pre-stored antenna-element output signals in the direction databank.

3. The measuring device according to claim 2, wherein:
   the search is performed using a search function, and
   the search function is a $\lambda^2$ function or a maximum likelihood function or is based upon a noise-density.

4. The measuring device according to claim 3, wherein:
   the direction uncertainty determination means are set up for determining the direction uncertainty angle from the search function.

5. The measuring device according to claim 4, wherein:
   the direction uncertainty determination means are set up for determining the direction uncertainty angle from the search function by determining a steepness of the search function at the direction of the electromagnetic signal.

6. The measuring device according to claim 5, wherein:
   the direction uncertainty determination means are set up for determining the direction uncertainty angle from the search function by determining an angular distance of two samples of the search function having a preset distance of respective search function values to a search function value of the direction of the electromagnetic signal.

7. A method for direction finding of an electromagnetic signal, the method comprising:
   determining the direction of the electromagnetic signal;
   displaying a circle indicating a search area on a display device;
   displaying the direction of the electromagnetic signal as a line originating at a center of the circle and pointing in the direction of the electromagnetic signal;
   determining a direction uncertainty angle of the direction of the electromagnetic signal; and
   displaying the direction uncertainty angle as a circle connected to an end of the line or the arrow pointing in the direction of the electromagnetic signal on the display device.

8. The method according to claim 7, further comprising:
   determining the direction of the electromagnetic signal by performing a search for a closest match of present antenna-element output signals resulting from the electromagnetic signal and pre-stored data linking antenna-element output signals to directions of electromagnetic signals within a direction databank.

9. The method according to claim 8, wherein:
   the search is performed using a search function, and
   the search function is a $\lambda^2$ function or a maximum likelihood function or is based upon a noise-density.

10. The method according to claim 9, further comprising:
    determining the direction uncertainty angle from the search function.

11. The method according to claim 10, further comprising:

determining the direction uncertainty angle from the search function by determining a steepness of the search function at the direction of the electromagnetic signal.

12. The method according to claim 11, further comprising:
determining the direction uncertainty angle from the search function by determining an angular distance of two samples of the search function having a preset distance of respective search function values to a search function value of the direction of the electromagnetic signal.

\* \* \* \* \*